United States Patent [19]

Bergman

[11] 4,450,859

[45] May 29, 1984

[54] SAFETY VALVE

[75] Inventor: Ulf C. Bergman, Malmoe, Sweden

[73] Assignee: Mechanical Technology Inc., Latham, N.Y.

[21] Appl. No.: 480,111

[22] Filed: Mar. 29, 1983

Related U.S. Application Data

[63] Continuation of Ser. No. 308,250, Oct. 5, 1981.

[51] Int. Cl.³ .................... F16K 17/04; F16K 25/00
[52] U.S. Cl. ............................... 137/516.29; 251/84
[58] Field of Search .................. 137/516.25, 516.29, 137/516.27; 251/84, 86, 210, 332

[56] References Cited

U.S. PATENT DOCUMENTS 2,830,620  4/1958  Shuptrine .................. 251/210 X
3,084,903  4/1963  Parks ........................ 251/210 X
3,557,826  1/1971  Albrecht .................... 137/516.29

FOREIGN PATENT DOCUMENTS 705675  3/1954  United Kingdom ............ 251/210

Primary Examiner—Alan Cohan
Assistant Examiner—John A. Rivell
Attorney, Agent, or Firm—Finnegan, Henderson, Farabow, Garrett & Dunner

[57] ABSTRACT

The safety valve contains a resilient gland to be held between a valve seat and a valve member and is secured to the valve member by a sleeve surrounding the end of the valve member adjacent to the valve seat. The sleeve is movable relative to the valve member through a limited axial distance and a gap exists between said valve member and said sleeve.

4 Claims, 3 Drawing Figures

SAFETY VALVE

This is a continuation application of Ser. No. 308,250 filed Oct. 5, 1981.

TECHNICAL FIELD

This invention relates to a safety valve having a spring biased valve member axially movable in a housing, and a resilient gland connected to the valve member and adapted to abut and seal an annular valve seat valve member. When the valve member moves to its closed position, it prevents passage of fluid through a high pressure inlet located centrally in the housing and opening into the housing through the valve seat which lies in a plane perpendicular to the direction of movement of the valve member and out through an outlet in the housing arranged remote from the seat.

DESCRIPTION OF THE PRIOR ART

Safety valves of the type referred to above may be used for very high differences in pressure across the valve seat—e.g. more than 20 MPA. During such use, the extremely high fluid velocities may deform the resilient gland and such deformations will have detrimental influence on the valve closing ability. Hitherto, the gland has been designed as a disc or a toroid ring fastened, e.g. vulcanised, to the valve member.

SUMMARY OF THE INVENTION

The object of the invention is to provide a safety valve of the type referred to above in which the resilient gland is secured to the valve member in such a way that the desired function of the safety valve is obtained even under extreme conditions. This object is achieved in this invention by locating the gland between a shoulder surface on the distal end of the valve member and an inwardly directed flange on a sleeve surrounding the valve member with a radial play and being axially movable relative thereto through a distance limited by interengaging stop surfaces on the sleeve and said valve member, so that the sleeve forms an axial extension of the valve member to shield the gland from the action of the high velocity fluid when the valve is open and to contact a part of said valve seat and compress and confine the gland in the closed valve position.

BRIEF DESCRIPTION OF THE DRAWING

The objects and advantages of the invention, and the invention itself, will become better understood by reference to the accompanying drawing which illustrates one embodiment of the invention and, together with the description, serves to explain the principles of the invention.

DESCRIPTION OF THE PREFERRED EMBODIMENT

Figure 1:
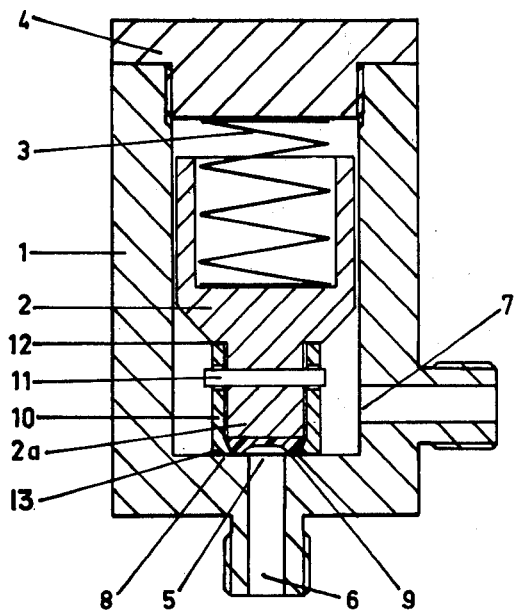
FIG. 1 is a vertical section through a safety valve according to the invention

Reference will now be made to preferred embodiment of the invention shown in the drawing.

FIG. 1 shows a housing 1 shaped as a hollow cylinder and containing a valve member 2 axially movable therein. The said valve member 2 is axially influenced by a prestressed compression spring 3 resting against a cover 4 forming a part of the housing 1. A first opening 5 in the housing 1 is located centrally and constitutes the end of a duct connection 6 to a high pressure fluid vessel (not shown). A second opening 7 in the housing is vented to the atmosphere or could be connected to a low pressure reservoir (not shown).

The interior surface area of the housing 1 surrounding the inlet 5 is designated by 8 and constitutes a valve seat adapted to be engaged by a resilient gland 9 attached to the lower end of the valve member 2. The valve seat 8 is also adapted to be engaged by a metal sleeve 10 surrounding a lower part 2a of the valve member 2 and connected thereto by a pin 11 passed through coaxially arranged holes in the valve member 2 and the sleeve 10. The holes in the sleeve 10 are of a diameter greater than the diameter of the pin 11, thus allowing limited relative axial movements of the sleeve 10 and the valve member 2.

The inner diameter of the sleeve 10 is somewhat greater—e.g. 0.5 mm—than the outer diameter of the lower part 2a of the sleeve 2. Axially active shoulder surfaces 12 on the valve member 2 and shoulder surface 22 on the sleeve 10 limit the axial movements of the sleeve 10 upwards relative the valve member 2.

The resilient gland 9 is of disc shape having a central part of almost uniform thickness and a peripheral bead along its periphery which is of larger axial dimensions. The material used may be a rubber quality of the type sold under the trade number Neoprene.

At its lower end the sleeve 10 is provided with a flange 13 engaging the gland 9 by a surface tapering frusto conically towards the valve seat engaging end (the lower end) of the sleeve 10.

The safety valve described above and shown in the drawing will operate as follows.

In the relative positions of the elements shown in FIG. 1 a high pressure prevails in the duct 6. The resilient gland 9 is forced against the inner frustoconically tapering surface of the flange 13. The gland 9 is also forced against the small gap between the sleeve 10 and the part 2a of the valve member 2 due to the low pressure prevailing in said gap.

Figure 2:
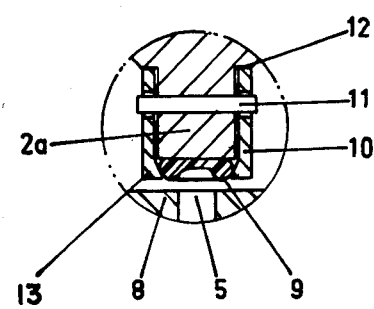
FIG. 2 is a vertical section corresponding to a part of FIG. 1 showing details in different relative positions and FIG. 3 is a view similar to that of FIG. 2, but showing still different relative positions.

When the pressure in the duct 6 exceeds a predetermined value, the spring 3 will be compressed and the valve member 2 will be axially displaced upwardly. The relative positions of the valve elements will now correspond to FIG. 2. Fluid will now escape through the inlet opening 5 into the valve housing and pass under the gland 9 and the flange 12 at great velocity. However, due to the low static pressure between the sleeve 10 and the part 2a the risk of blowing away the gland 9 is small.

Figure 3:
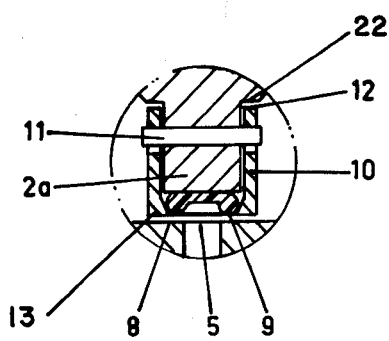

Shortly after the opening of the safety valve the elasticity of the gland 9 may cause the sleeve 10 to move downwardly. A gap will now occur between the surfaces 12 and 22 the downward movement of the sleeve 10 will further protect the gland 9 from being blown away. This situation has been depicted in FIG. 3. As soon as the pressure in the duct 6 has decreased below a certain value the spring 3 will cause the valve member 2 to move downward and the lower end surface of the sleeve 10 will contact the valve seat 8.

A further downward movement of the valve member 2 will cause a relative axial movement of the flange 13 and the part 2a causing a compression of the gland 9. The gland will now be firmly held by the flange 13 and as soon as the flow through the opening 5 is stopped the pressure will again cause the gland to be pressed in the direction towards the gap between the sleeve 10 and the part 2a as shown in FIG. 1.

I claim:

1. An improved safety valve of the kind including a housing, a valve member axially movable therein from a closed valve position to an open valve position, a prestressed compression spring mounted between said member and said housing, a first opening located centrally in said housing and surrounded by an annular valve seal lying in a plane perpendicular to the direction of movement of said valve member, a second opening in said housing arranged remote from said seat, and a resilient gland operatively associated with said valve member and adapted to abut said valve seat in the closed position, wherein the improvement comprises:

a shoulder on said valve member;

a sleeve surrounding said valve member, said sleeve having a top and bottom end and having an inner diameter greater than the outer diameter of said valve member to allow relative axial movement of said sleeve in an upward direction;

the top end of said sleeve limiting the distance of said relative upward axial movement by engagement with said valve member shoulder;

the bottom end of said sleeve forming an axial extension beyond said valve member so as to surround said resilient gland and to contact a part of said valve seat in the closed valve position such that said sleeve acts as a support for said gland in the closed valve position;

means for connecting said valve member and said sleeve to provide limited relative axial movement of said sleeve in a downward direction in the open valve position such that said sleeve shields said gland from high velocity fluid in the open valve position; and an inwardly directed flange on said bottom end of said sleeve for engaging said resilient gland such that the relative axial movement of said flange in said upward direction compresses said gland in the closed valve position and the expansion of said resilient gland against said flange causes axial movement of said sleeve in the downward direction in the open valve position, said connecting means also allowing said limited movement of said sleeve relative to said valve member in the upward direction in the closed valve position, said limited upward movement also limiting the compression of said resilient gland by said valve member.

2. A safety valve according to claim 1, wherein said resilient gland is disc shaped and includes a peripheral bead of generally circular radial cross-section, the thickness of said peripheral bead portion as measured in the axial direction being greater than the thickness of the central disc portion.

3. A safety valve according to claim 1, wherein said means for connecting said valve member and said sleeve includes a pin extending through holes on said valve member and said sleeve perpendicular to the axis of said sleeve, the holes provided in said sleeve having a diameter greater than that of said pin.

4. A safety valve according to claim 1 wherein said resilient gland has a downwardly extending peripheral portion positioned to bypass said flange in the axial direction when said gland is compressed by the valve member.

* * * * *